No. 874,534. PATENTED DEC. 24, 1907.
W. H. PARLIN.
WHEEL PLOW.
APPLICATION FILED MAY 11, 1906.
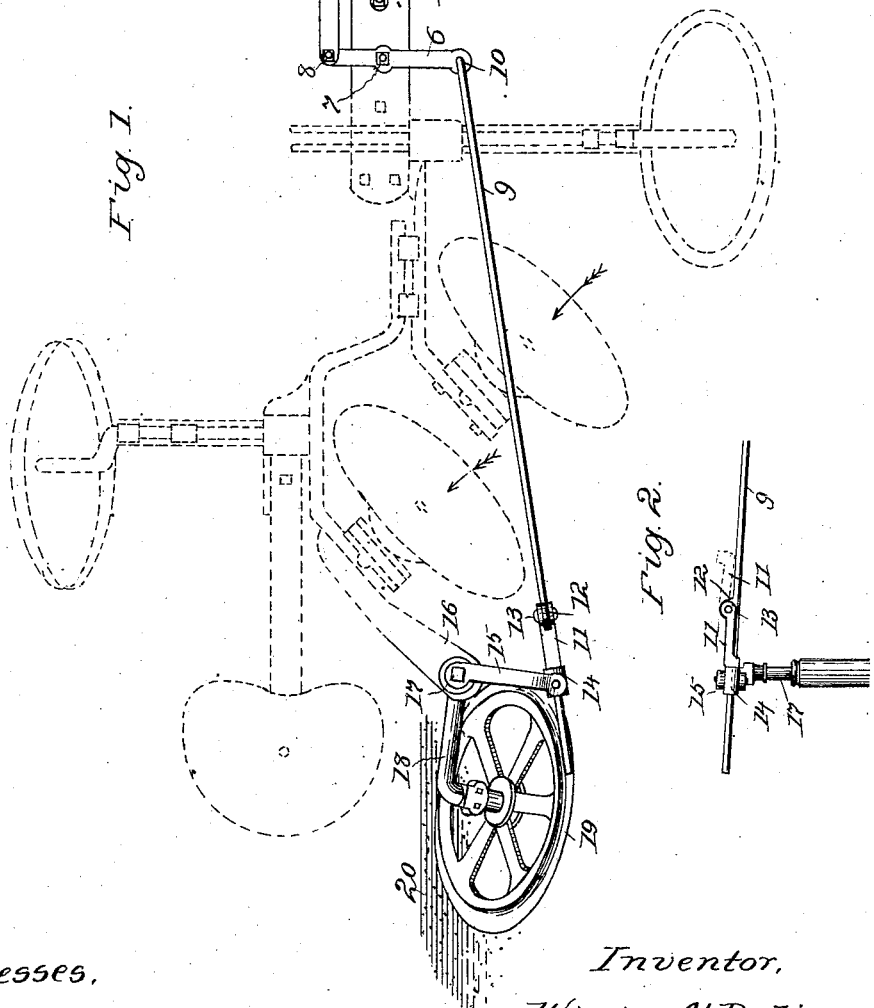
Witnesses,
Nora Graham
Fay Graham
Inventor,
William H. Parlin,
by L. P. Graham
his attorney.

UNITED STATES PATENT OFFICE.

WILLIAM H. PARLIN, OF CANTON, ILLINOIS, ASSIGNOR TO PARLIN & ORENDORFF COMPANY, OF CANTON, ILLINOIS, A CORPORATION OF ILLINOIS.

WHEEL-PLOW.

No. 874,534.  Specification of Letters Patent.  Patented Dec. 24, 1907.

Application filed May 11, 1906. Serial No. 316,370.

*To all whom it may concern:*

Be it known that I, WILLIAM H. PARLIN, a resident of the city of Canton, county of Fulton, and State of Illinois, have invented certain new and useful Improvements in Wheel-Plows, of which the following is a specification.

This invention relates to wheel plows in which the rear caster wheel runs against a side of a furrow to hold the plow from cutting too far to land, and the general idea is to control the caster wheel from the draft evener by means of a connection that extends clear of the seat and high enough to permit any desired degree of adjustment of the frame vertically on the caster shaft.

The invention is particularly applicable to disk plows, although not necessarily confined thereto.

In the drawing forming part of this specification, so much of a wheel plow as is needed to explain my invention is shown in plan in Figure 1; the parts most directly concerned with my invention being shown in solid lines and more remote parts being shown in broken lines. Fig. 2 is a detail in side elevation of the swingable stop arm and parts directly related thereto.

The draft bar of the plow frame is shown at 1 and an evener 2 is pivotally hitched at 3 to the front end of the draft bar. A link bar 4 connects pivotally with the evener at 5 and the rear end of the link is connected with cross lever 6 at 8. The lever is fulcrumed between its ends to the draft bar, as shown at 7 and the caster-controlling strut rod 9 extends rearward from end 10 of the cross lever. A bracket 16 is attached to the rear part of the plow frame and it forms a bearing for the caster shaft 17. An extension 18 of the caster shaft 17 projects rearward and then turns sidewise to provide a spindle for the caster wheel 19. An arm 15 is secured to the upper end of the caster shaft, a collar 14 is swiveled in the swinging end of arm 15 and the controlling rod 9 extends slidably through the collar. A swingable stop arm 11 is pivoted at 13 on a lug 12 of the rod 9 and when the stop is laid down against the collar, as shown in the drawings, its swingable end bears normally against the collar and forms a stop for arm 15, and for the caster wheel 19.

The caster wheel runs against a side of furrow 20, the resistance of the soil acts obliquely on the plows, as shown by the arrows, and tends to force the plows to land. The bearing of stop arm 11 against collar 14 prevents the rearward extension 18 of the caster shaft from swinging in a direction away from the furrow to an extent sufficient to materially affect the action of the plows and the caster wheel runs as nearly true along the furrow as the team sway imparted to the caster arm through the evener will permit. The oblique soil pressure would force the caster wheel to swing to the right, if the wheel were unrestrained, and this would carry the swinging end of arm 15 forward and permit the plows to drift landward. But the rod 9 takes the forward thrust of the arm and holds the arm as nearly steady as practical results demand.

The long end of the evener extends to the land side of the draft hitch, in order to dispose the team advantageously with reference to the furrows, and the link 4 connects with the lower end of the evener. The push of the caster arm against the shoulder of the strut rod is transmitted to the evener as a pull and the force required to restrain the caster wheel within practical limits tends to equalize the pull on the two ends of the evener, or to apply the entire draft of the plow to approximately the longitudinal center of the evener.

The rod 9 extends to one side of the driver's seat, entirely out of line therewith, the arm 15 extends away from the seat and so it is possible to have the arm so high that adjustment of the frame on the caster shaft, or of adjustment of the shaft in the frame, may be made to any desired extent without disturbing the arm.

The plow is ordinarily turned to the left and the stop arm 11 moves away from the collar to give the caster wheel free swing in turning. As the parts line up after a turn is made the stop arm automatically assumes its shown contact with the collar and reassumes its caster-controlling function. In case it should be desired to turn the plow to the right, at an end of the field, or otherwhere, the stop arm 11 is swung on pivot 13 and enough clearance is thereby established to permit the required forward swing of the arm 15.

While the connection with the evener does not form a rigid stop for the caster wheel, it operates in a manner sufficient for all practical purposes and has the added advantage of throwing a pull onto the long end of the evener to equalize the draft.

I claim;—

1. In a wheel plow, the combination of a plow frame, a draft evener pivotally connected with the front end of the plow frame, a caster wheel mounted on a rearward extension of a vertical shaft journaled in a bearing in the rear end of the plow frame, an arm secured to the upper end of the caster wheel shaft and extended sidewise therefrom, a lever fulcrumed between its ends on the plow frame, a connection between the arm of the caster wheel shaft and one end of the lever upon the same side of their respective pivotal points, and a connection between the other end of the lever and the evener upon the same side of their respective pivotal points, substantially as described.

2. In a wheel plow, the combination of a plow frame, a draft evener pivotally connected with the front end of the plow frame, a caster wheel mounted on a rearward extension of a vertical shaft journaled in a bearing in the rear end of the plow frame, an arm secured to the upper end of the caster shaft and extended sidewise therefrom, a collar swiveled in the swinging end of the arm, a strut rod extended through the collar and having a stop adapted to engage the front side of the collar, a cross lever with one end of which the front end of the strut rod is connected, and a link connecting the other end of the cross lever with the evener at a point to one side of the draft hitch, substantially as described.

3. In a wheel plow, the combination of a plow frame, a draft evener pivotally connected with the front end of the plow frame, a caster wheel mounted on a rearward extension of a caster shaft having a bearing in the rear end of the plow frame, an arm secured to the upper end of the caster shaft, a collar swiveled in the swinging end of the arm, a strut rod extended through the collar, a swingable stop arm pivotally connected with the strut rod at some distance in front of the collar and adapted to lie with its swingable end in contact with the collar, a cross lever with one end of which the front end of the strut rod is connected, and a link connecting the other end of the cross lever with the evener, substantially in the manner and for the purpose described.

In testimony whereof I sign my name in the presence of two subscribing witnesses.

WM. H. PARLIN.

Witnesses:
ALICE M. HUTTON,
M. LOUISE MORTON.